Aug. 26, 1952 C. J. RICHARDS 2,608,658

TELEVISION ANTENNA CONSTRUCTION

Filed Sept. 23, 1949

INVENTOR

Clarence J. Richards

Patented Aug. 26, 1952 2,608,658

UNITED STATES PATENT OFFICE 2,608,658

TELEVISION ANTENNA CONSTRUCTION

Clarence J. Richards, Monrovia, Calif., assignor to Ricka Richards, Los Angeles, Calif.

Application September 23, 1949, Serial No. 117,312

1 Claim. (Cl. 250—33.51)

This invention relates to improvements in a television receiving antenna. The general object of my invention is to construct a television receiving antenna which will remain on the beam in every operating position, and will deliver to the television receiver the proper amount of electrical energy to synchronize the television receiving set with the transmitting station to which the television receiver is tuned.

Another object of my invention is to insulate and shield the signal pick-up element from the deflection shield.

Another object of my invention is to construct a television receiving antenna that will operate and remain on the beam in every operating position, in either a vertical or horizontal plane, with or without a rotating device, that is directional and is at all times on the beam with the television transmitting station to which the television receiving set is tuned, and which contains a shielded parabolic or curved signal receiving element, designed so as not to deflect receiving signals back into signal receiving element.

Another object of my invention is to construct a television receiving antenna that will deflect objectional signals.

Figures 1, 2:
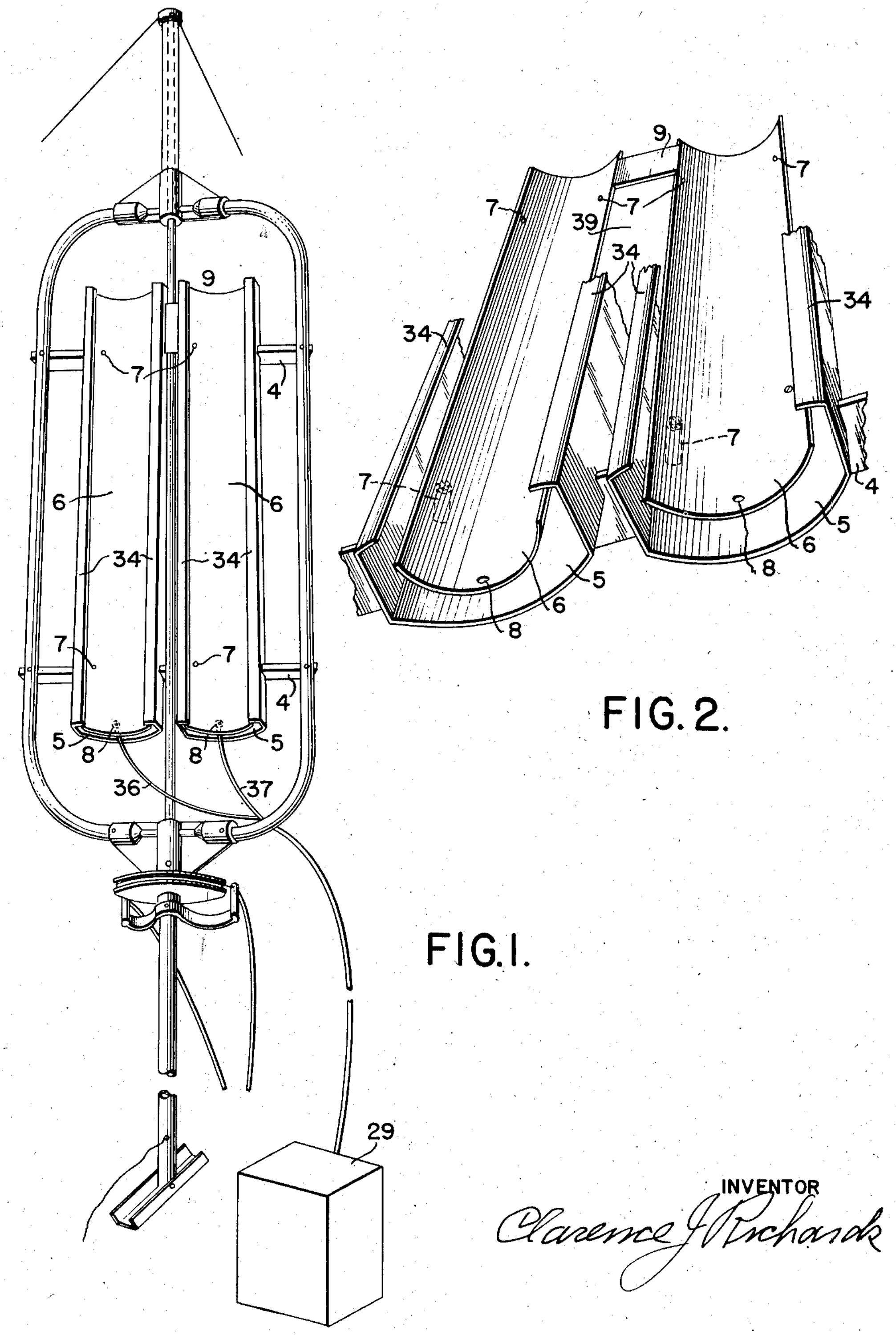
Fig. 1 is a view in elevation of my antenna.
Fig. 2 is a view similar to Fig. 1, showing a parabolic or curved surface signal pick-up element, secured to insulators, and housed in a shield which is partly open on one side.

Referring to Fig. 2 a television receiving antenna is shown consisting of two pieces of conductive material 6, having a parabolic or curved surface and called the signal pick-up element. The pick-up element 6 is secured to and supported upon insulators 7 of sufficient length to insulate pick-up element 6 from shields 5.

The opposite ends of insulators 7 are secured to shield 5 at lower 7. The shields 5 are secured to brackets 4. The pick-up element 6 is fed at the points 8 and 8 through transmission lines 36—37.

In operation of the system the shields are partly open on sides, allowing signal waves to enter. As the antenna is rotated only a certain amount of signal pick-up element 6 is exposed to signal waves.

The shield 5 deflects objectional signals away from the pick-up element. The edges of shield at 34 direct signals, and allow only the desired amount of signals to enter signal pick-up element 6 on a directional plane. The signal pick-up element 6 is at all times on the beam with the television transmitting station, and the pick-up element 6 will pick up more or less signals as required when the antenna is rotated.

The antenna can be operated in a stationary position with the pick-up element facing the television transmitting station. The amount of signals received can be regulated by turning antenna until the signal pick-up element is on the beam, and the television receiving set receives the required input. The antenna may then be locked in position.

The signal pick-up element 6 is fed as follows. When the television receiving set 29 is in operation, the current flows down from the pick-up element terminal 8, through line 36 to the television receiving set 29, then through the television set up line 37, to opposite terminal of pick-up element 8, then up the pick-up element 6, across the top of pick-up element at 9, then down to terminal 8 which completes the circuit.

The amount of energy which flows down from the pick-up element terminal 8, to the television receiving set 29, is governed by turning antenna until the pick-up element 6 is on the beam for the proper input to the television receiving set.

The transmission lines 36—37 should be of sufficient size so as not to retard delivery of signals from the pick-up element 6, to the television receiving set 29.

The amount of control that the pick-up element 6 has on the television receiving set depends on the proper shielding of the television receiving set and lead-in wires, as the pick-up element 6 will have no control over signals picked up by unshielded television receiving set 29. But the pick-up element 6 can deliver more signals and keep the television receiving set on the beam, providing the signals picked up by the nonshielded television receiving set are not interfering signals.

From the foregoing it will be seen that I have invented a television receiving antenna containing a signal input control, that is shielded, and is directional in operation, and contains an insulated parabolic or curved pick-up signal control element, which operates in a vertical or horizontal plane, and is on the beam with the transmitting station in every operating position. That signal control element is shielded to deflect objectional signals and back wash.

I claim:

An antenna comprising two similar and separate elongated metal sheets curved in a direction perpendicular to their length, said metal sheets being positioned side by side, a separate deflection shield for each of said sheets each partially surrounding a metal sheet and insulated therefrom, and a two conductor transmission line each conductor of said transmission line being connected to a different one of said sheets.

CLARENCE J. RICHARDS.

REFERENCES CITED

The following references are of record in the file of this patent:

UNITED STATES PATENTS

| Number | Name | Date |
|---|---|---|
| 1,433,921 | Watkins | Oct. 31, 1922 |
| 2,847,872 | Hand | Mar. 1, 1932 |
| 2,238,770 | Blumlein | Apr. 15, 1941 |
| 2,255,520 | Schuster | Sept. 9, 1941 |
| 2,366,634 | Ludwig | Jan. 2, 1945 |
| 2,430,353 | Masters | Nov. 4, 1947 |
| 2,433,183 | Wolf | Dec. 23, 1947 |

FOREIGN PATENTS

| Number | Country | Date |
|---|---|---|
| 877,658 | France | Dec. 14, 1942 |

OTHER REFERENCES

Radio, June 1939, page 47.

Radio News, January 1937, pages 396 and 397.